United States Patent
Roussely-Rousseau et al.

(10) Patent No.: US 9,062,605 B2
(45) Date of Patent: Jun. 23, 2015

(54) TURBOJET INCLUDING AN AUTOMATICALLY VARIABLE FLOW RATE BLEED CIRCUIT FOR COOLING AIR

(75) Inventors: Amaury Roussely-Rousseau, Paris (FR); Emmanuel Berche, Vernou la Celle sur Seine (FR); Guy Burlet, Paris (FR)

(73) Assignee: SNECMA, Paris (FR)

(*) Notice: Subject to any disclaimer, the term of this patent is extended or adjusted under 35 U.S.C. 154(b) by 828 days.

(21) Appl. No.: 13/315,746

(22) Filed: Dec. 9, 2011

(65) Prior Publication Data

US 2012/0151936 A1    Jun. 21, 2012

(30) Foreign Application Priority Data

Dec. 10, 2010  (FR) .................................... 10 60371

(51) Int. Cl.
| | |
|---|---|
| *F01D 17/06* | (2006.01) |
| *F02C 6/08* | (2006.01) |
| *F01D 5/08* | (2006.01) |
| *F01D 25/12* | (2006.01) |
| *F02C 7/18* | (2006.01) |
| *F02C 9/18* | (2006.01) |

(52) U.S. Cl.
CPC . *F02C 6/08* (2013.01); *F01D 5/081* (2013.01); *F01D 25/12* (2013.01); *F02C 7/18* (2013.01); *F02C 9/18* (2013.01); *Y02T 50/672* (2013.01); *Y02T 50/676* (2013.01); *F05D 2270/303* (2013.01); *F05D 2300/50212* (2013.01); *F05D 2300/507* (2013.01)

(58) Field of Classification Search
CPC ......... F01D 17/00; F01D 17/06; F01D 17/12; F01D 5/081; F01D 5/082; F05D 2230/507; F05D 2260/606

USPC ................. 416/3; 415/12, 42, 145, 126
See application file for complete search history.

(56) References Cited

U.S. PATENT DOCUMENTS

| | | | |
|---|---|---|---|
| 2,906,494 A | | 9/1959 | McCarty et al. |
| 2,977,089 A | | 3/1961 | McCarty et al. |
| 3,575,528 A | * | 4/1971 | Beam et al. ..................... 416/39 |
| 3,712,756 A | | 1/1973 | Kalikow et al. |
| 4,213,738 A | * | 7/1980 | Williams ........................ 416/95 |
| 7,445,424 B1 | * | 11/2008 | Ebert et al. .................... 415/113 |
| 2011/0005222 A1 | * | 1/2011 | Hayashi et al. ................. 60/602 |

FOREIGN PATENT DOCUMENTS

GB    2 015 085 A    9/1979

OTHER PUBLICATIONS

French Preliminary Search Report issued Jun. 28, 2011, in French 1060371, filed Dec. 10, 2010 (with English Translation of Category of Cited Documents).

* cited by examiner

*Primary Examiner* — Dwayne J White
*Assistant Examiner* — William Grigos
(74) *Attorney, Agent, or Firm* — Oblon, McClelland, Maier & Neustadt, L.L.P.

(57) ABSTRACT

Bleeding cooling air to cool a subassembly, e.g. such as a turbine, with automatic adjustment of the air flow section as a function of the speed of the engine. According to the invention, a shutter element is fastened to co-operate with a bleed hole, with the material that constitutes either the shutter element or the wall in which the hole is formed being of a type in which it is possible to create eddy currents, and a magnet is mounted to move past said arrangement.

5 Claims, 2 Drawing Sheets

TURBOJET INCLUDING AN AUTOMATICALLY VARIABLE FLOW RATE BLEED CIRCUIT FOR COOLING AIR

FIELD OF THE INVENTION

The invention relates to a turbojet including at least one air bleed circuit for cooling a subassembly, such as a turbine, for example. The invention relates more particularly to an improvement that enables the cooling air flow rate to be varied as a function of the operating speed of the turbojet, by means that are simple, and that operate automatically and quickly.

BACKGROUND OF THE INVENTION

In an airplane turbojet, it is necessary continuously to cool certain subassemblies by a flow of relatively cool air, where such subassemblies may for example be the high-pressure turbine and/or the low-pressure turbine.

By way of example, air is bled off by defining a bleed chamber in communication with a compressor, the bleed chamber having a wall that includes bleed holes to allow cooling air to escape towards the subassembly for cooling.

The wall of such a bleed chamber is generally pierced by a plurality of holes that are regularly distributed circumferentially and that define the overall flow rate of cooling air.

The flow rate is not optimized since it is necessarily adjusted to ensure sufficient cooling during periods when the turbojet is operating at high power, e.g. at full throttle as is needed during the period corresponding to takeoff. At any other speed, i.e. in particular at cruising speed or at taxiing speed, the flow rate of cooling air is much greater than that which is strictly necessary. Now, during the major portion of the time the turbojet is in use, its operating speed is specifically cruising speed.

This failure to optimize the cooling air flow rate is very expensive, in particular in terms of engine performance. The cooling air as bled, e.g. from the high-pressure compressor, does not participate in combustion. Consequently, if an excessive quantity of air is bled off, then there is a loss of efficiency and an increase in pollution.

OBJECT AND SUMMARY OF THE INVENTION

It is difficult to envisage making use of a system for adjusting the flow rate in controlled manner because that would require additional equipment to be added to the turbojet, which equipment would be expensive, bulky, and heavy. The invention seeks to provide a solution to that problem, which solution is simple and inexpensive, and in which variation takes place automatically and quickly and does not require any heavy and bulky equipment.

More particularly, the invention provides a turbojet including a cooling air bleed circuit arranged between two adjacent subassemblies, at least one of which is mounted to rotate at a speed related to the speed of rotation of a turbine, bleed holes being defined through a wall of one of the subassemblies, wherein:

these bleed holes are situated facing and close to a portion of the other subassembly;
at least one shutter element is shaped to press against a face of said wall and is fastened thereto in order to co-operate with such a bleed hole to define a flow section that increases with increasing speed of said turbine;
the material of the wall in which said bleed hole is formed or the material constituting said shutter element is a material of a type in which eddy currents can be created; and
said portion of the other subassembly carries at least one magnet such that relative rotation as a function of the speed of said turbine is established between said magnet and the bleed hole that is fitted with an above-mentioned shutter element.

For example, the cooling air is guided to cool said turbine, generally the high-pressure turbine or some other turbine, possibly the low-pressure turbine.

The bleed chamber may be arranged in a stator portion of the turbojet or in any other stationary casing, and it may receive air from a high-pressure compressor stage so as to reinject it, e.g. via a space defined upstream from the disk of the high-pressure turbine. Under such circumstances, it is thus more particularly the high-pressure turbine that is cooled. Other subassemblies of the turbojet may be cooled by implementing the same principle, by selecting the location of said bleed chamber. For example, the same system may be applied to cooling the low-pressure turbine.

The wall of the bleed chamber may be fitted with a plurality of shutter elements, that are stationary and circumferentially distributed over a face of said wall, coaxially about the axis of rotation of the turbojet. Each element co-operates with at least one bleed hole in said wall.

The magnet (possibly a plurality of magnets that are regularly distributed circumferentially at the same distance around the axis of rotation) may be secured to a portion of the rotor of the turbine.

For example, the shutter element may comprise a thin metal plate in which it is possible to create eddy currents. This metal plate thus expands quickly in register with the corresponding hole in the wall of the bleed chamber, thus making it possible to vary the air flow section in the desired direction. More particularly, the faster the speed of rotation of the magnet (when the speed of the turbojet increases), the greater the increase in the flow section.

In a variant, the shutter element is made of a material having a low coefficient of expansion based on a ceramic, while the wall in which said bleed hole is formed is made of a metal in which it is possible to create eddy currents. In this variant, it is thus the wall of the bleed chamber that serves to vary the flow rate by expanding.

This effect of rapidly increasing the flow section that is caused by localized heating as a result of eddy currents can be combined with any other effect due to the normal ambient heating that results merely from the fact that the temperature rises during a period of operating at full throttle (takeoff). Under such circumstances, the wall in which the bleed hole is formed and the corresponding shutter element are made of materials having significantly different coefficients of expansion, as envisaged above. The wall may be made of a magnetizable metal and the shutter element may be made of a ceramic-based composite material. The arrangement is such that the two sources of heating combine to increase the cooling air flow rate, although nevertheless with response times that are different.

BRIEF DESCRIPTION OF THE DRAWINGS

The invention can be better understood and other advantages thereof appear better in the light of the following description of a turbojet in accordance with the principle of the invention, the description being given purely by way of example and being made with reference to the accompanying drawings, in which:

FIG. 1 is a diagrammatic fragmentary view in longitudinal half-section of a portion of a turbojet fitted with the improvement in accordance with the invention.

MORE DETAILED DESCRIPTION

Figure 1:
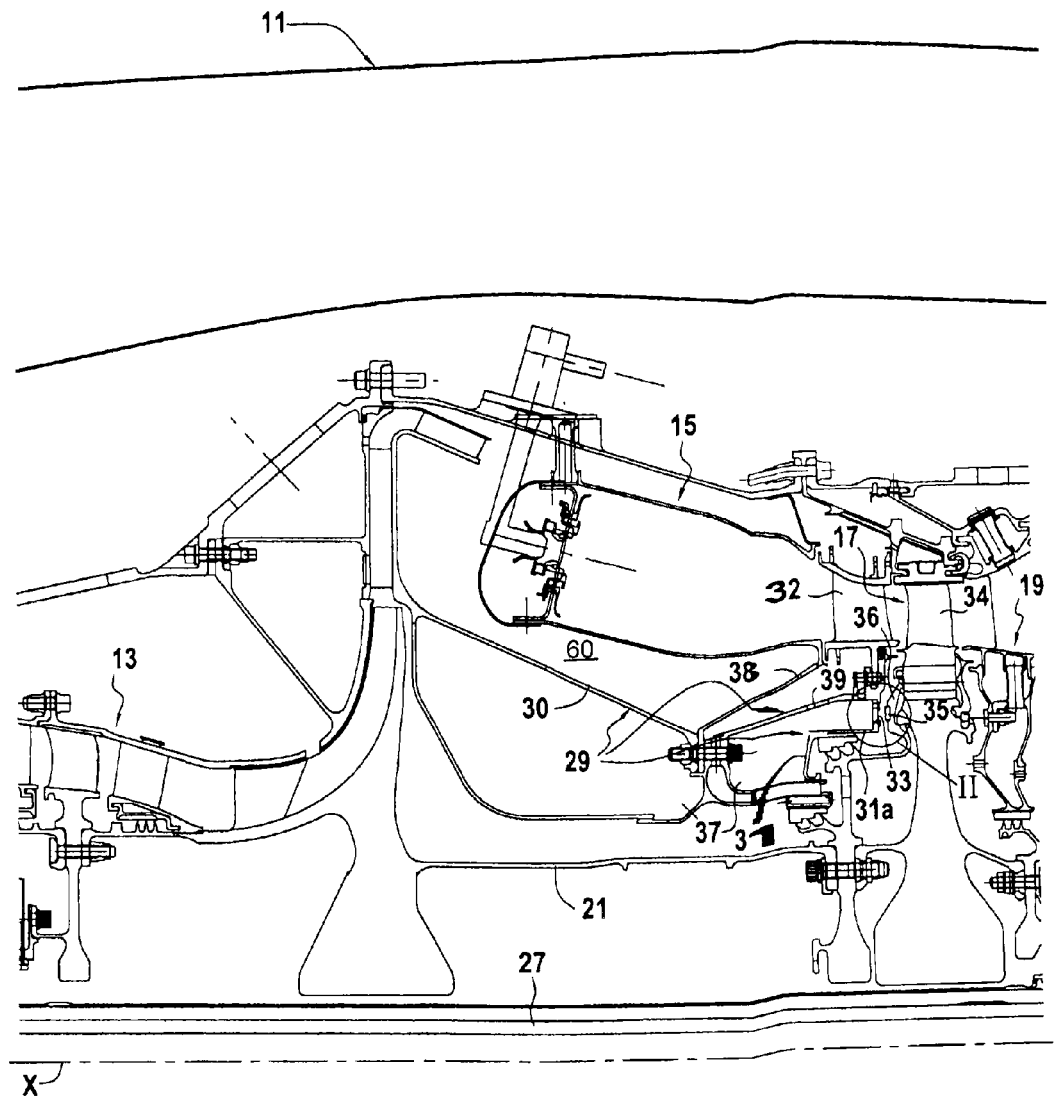

With reference to the drawings, there can be seen in part in FIG. 1, which is in axial half-section, certain portions of a turbojet 11 that are involved by the invention. There can be seen in particular the high-pressure compressor 13, the combustion chamber 15, the high-pressure turbine 17, and the low-pressure turbine 19. Conventionally, two coaxial shafts are arranged along the axis of rotation X of the rotary portions of the compressor and of the turbines. A high-pressure shaft 21 is driven by the high-pressure turbine 17 and drives the rotor of the compressor 13 in rotation. A low-pressure shaft 27 is driven by the low-pressure turbine 19 and serves in particular to drive a fan (not shown) in rotation.

In the example, consideration is given to two particular subassemblies. A stationary, first subassembly 29 comprises the casing 30 of the combustion chamber 15, the support 31 of the nozzle 32 placed at the outlet from the combustion chamber, and the rotor 34 of the high-pressure turbine 17.

A rotary, second subassembly is constituted by the high-pressure turbine, and more particularly by its rotor 34.

The support 31 of the nozzle has a wall 31a with air feed holes 33 formed therein. The bleed air comes from the high-pressure turbine via the annular chamber 60 surrounding the combustion chamber 15 and the adjacent chambers 36, 37 in communication with the chamber 60 via orifices 38, 39. In this example, the wall 31a is one of the walls of the chamber 37 and it is clear that a portion of the air that flows around the combustion chamber 15 escapes via the bleed holes 33 into an annular space facing the disk 36 of the rotor 34. This air is thus intended more particularly for cooling the rotor 34 of the high-pressure turbine.

The air feed holes 33 are regularly spaced apart circumferentially along a circle that is centered on the axis X.

Furthermore, these air bleed holes 33 are situated facing and close to a portion of the second subassembly, i.e. in this example an annular zone of the disk 36 of the rotor 34. This portion carries at least one magnet 35 such that relative rotation is created between the magnet 35 and the or each air bleed hole 33. The speed of rotation is a function of the speed of the turbine.

The total cross-section of all of the air bleed holes 33 is determined so as to ensure that air flows at a desired rate for cooling the high-pressure turbine when it is rotating at maximum speed, typically on takeoff.

Furthermore, at least one shutter element 40 is shaped to press against a face of the wall 31a and is fastened thereto so as to co-operate with a bleed hole 33. The shutter element is mounted in such a way as to restrict flow through the hole 33 by amounts that vary as a function of conditions that are explained below.

In any event, the arrangement is such that the flow section increases with increasing speed of the turbine 34.

As a general rule, the material of the wall in which the hole is formed or the material constituting the shutter element is of the type in which eddy currents can be created, typically a magnetizable metal. If such eddy currents are created, then that results in local expansion of the shutter element 40 or of the wall 31a.

Advantageously, each hole 33 co-operates with a shutter element 40 for a maximum amplitude of air flow rate variation. A plurality of magnets 35 may be fastened to the rotor disk, being regularly spaced apart circumferentially.

Eddy currents are generated, and by local heating, they give rise to this local expansion, which is a function of the speed of the turbine, and which is suitable for increasing the flow rate of air as a function of speed.

Figure 2A:
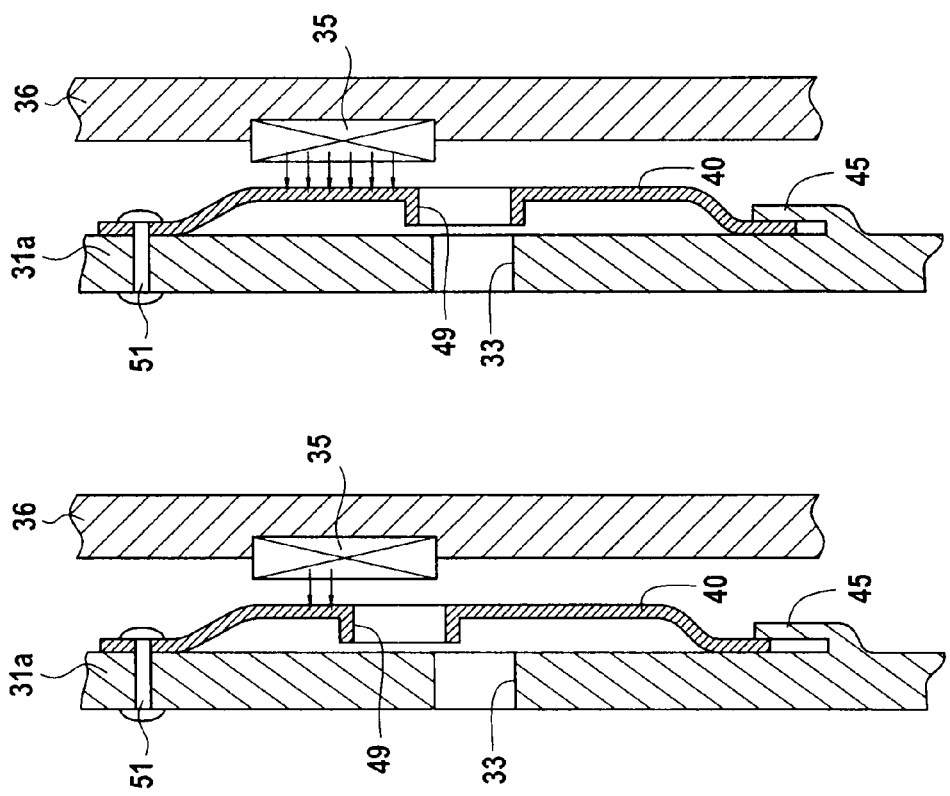
FIGS. 2A and 2B are diagrammatic views on a larger scale of one possible embodiment of the passive valve system of the invention, corresponding to outline II in FIG. 1.
Figure 2B:
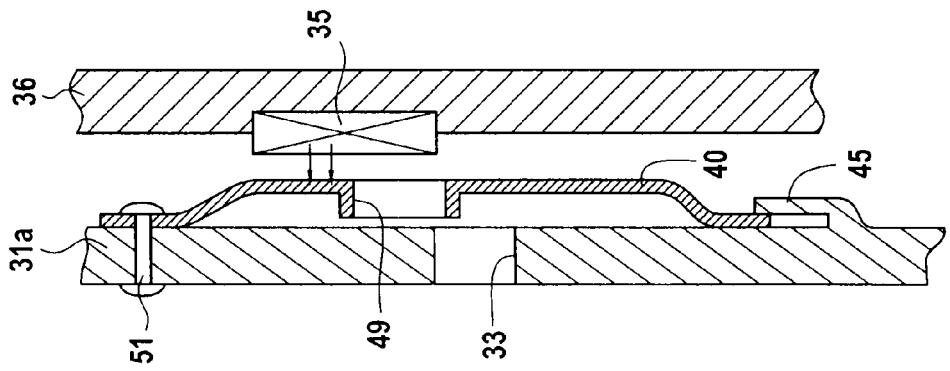

FIGS. 2A and 2B show an embodiment in which the shutter element 40 comprises a thin metal plate in which eddy currents may be created. More particularly, the wall 31a has a slideway 45 formed as a projection thereon, and situated in the vicinity of each hole 33.

In this example, the shutter element is in the form of a tongue having a passage 49, here formed by means of a cylindrical sleeve. The passage occupies a position that corresponds with the position of the hole 33 to an extent that is variable.

One end of the tongue is slidably engaged in the slideway, while its other end is fastened to the wall 31a (by a rivet 51 in this example). The tongue has a saucer-shape profile so as to be in as little heat-conductive contact as possible with the wall 31a. Furthermore, since the tongue is much closer to the path followed by the magnet than it is to the wall 31a, it is mainly in the tongue that eddy currents are generated. In other words, the magnet(s) move(s) past the tongue(s) and generate(s) eddy currents therein.

In FIG. 2A, which corresponds to operation at low speed or at cruising speed, the eddy currents are not very great, and they heat the tongue only moderately. There is a desired offset between the hole 33 and the passage 49 in the tongue. The flow rate is low, but sufficient for the speed under consideration. This is the situation that occurs during the major portion of a flight. Relatively little air is bled from the high-pressure compressor 13.

In contrast, on takeoff, the turbine is rotating at full speed and thus much faster. Eddy currents increase in the shutter member, which expands to a much greater extent and much more quickly than does the wall 31a. Consequently, the passage 49 in a shutter element tends to come closer laterally to the corresponding hole 33 and the air flow rate increases. This is the situation shown in FIG. 2B.

Figure 3A:
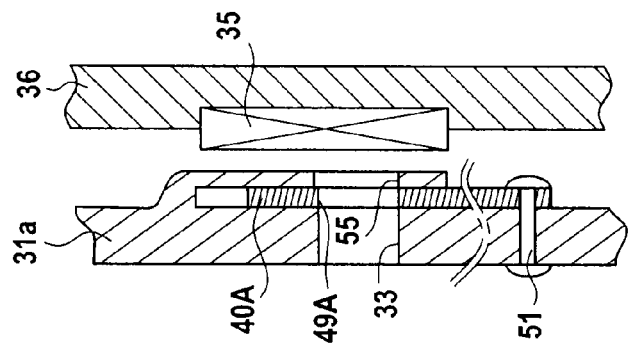
FIGS. 3A and 3B are views comparable to FIGS. 2A and 2B, showing a variant.
Figure 3B:
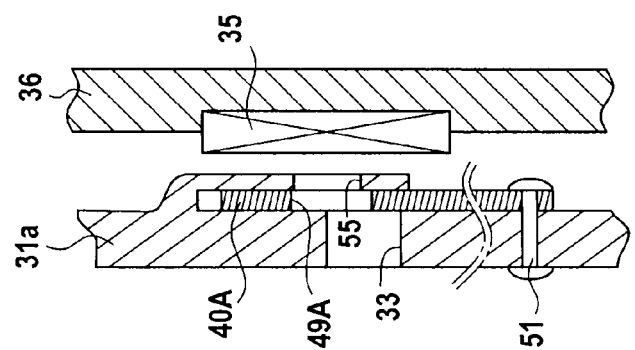

In the embodiment of FIGS. 3A and 3B, the shutter element 40A is made of a material having a small coefficient of expansion, e.g. a ceramic-based material, and the wall 31a in which the bleed hole 33 is formed is made of metal in which it is possible to create eddy currents.

More precisely, in the vicinity of each hole 33, the wall 31a carries a plate of ceramic-based composite material (thus having a low coefficient of expansion) having a hole 49a that corresponds in part with the hole 33 (FIG. 3A). The plate is riveted to the wall 31a at a certain distance from the hole 33. It slides in a slideway that is itself provided with a hole 55.

At low speed or at cruising speed, the situation is as shown in FIG. 3A. The flow rate is limited by the three holes 33, 49A, and 55 corresponding in part only.

At full speed, eddy currents give rise to localized expansion of the wall 31a (where it faces the path of the magnets), and more particularly in the thin-walled portion constituting the slideway and including the hole 55. As a result, and as shown in FIG. 3B, the holes tend to move into alignment, and consequently they allow air to pass at a greater flow rate.

What is claimed is:

1. A turbojet including a cooling air bleed circuit arranged between two adjacent subassemblies, at least one of which is mounted to rotate at a speed related to the speed of rotation of a turbine, bleed holes being defined through a wall of one of the subassemblies, wherein these bleed holes are situated facing and close to a portion of the other subassembly, wherein:

these bleed holes are situated facing and close to a portion of the other subassembly;

at least one shutter element is shaped to press against a face of said wall and is fastened thereto in order to co-operate with such a bleed hole to define a flow section that increases with increasing speed of said turbine;

the material of the wall in which said bleed hole is formed or the material constituting said shutter element is a material of a type in which eddy currents can be created; and said portion of the other subassembly carries at least one magnet such that relative rotation as a function of the speed of said turbine is established between said magnet and the bleed hole that is fitted with an above-mentioned shutter element.

2. A turbojet according to claim 1, wherein the magnet is secured to a portion of the rotor of said turbine.

3. A turbojet according to claim 1, wherein said bleed hole and the corresponding shutter element are carried by a stationary casing receiving ventilation air bled from a compressor.

4. A turbojet according to claim 1, wherein said shutter element comprises a thin metal plate in which it is possible to create eddy currents.

5. A turbojet according to claim 1, wherein said shutter element is made of a material having a low coefficient of expansion, e.g. a ceramic-based material, and wherein the wall in which said bleed hole is formed is made of metal in which it is possible to create eddy currents.

* * * * *